United States Patent
Seki et al.

(10) Patent No.: US 9,341,495 B2
(45) Date of Patent: May 17, 2016

(54) MOBILE TERMINAL APPARATUS AND ORIENTATION PRESENTMENT METHOD

(75) Inventors: Kousuke Seki, Tokyo (JP); Hideo Kawabe, Saitama (JP); Osamu Ito, Tokyo (JP); Takeshi Maeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 303 days.

(21) Appl. No.: 13/587,360

(22) Filed: Aug. 16, 2012

(65) Prior Publication Data

US 2013/0049957 A1 Feb. 28, 2013

(30) Foreign Application Priority Data

Aug. 26, 2011 (JP) ................. 2011-184691

(51) Int. Cl.
G08B 1/08 (2006.01)
G01C 21/36 (2006.01)
G01C 21/20 (2006.01)

(52) U.S. Cl.
CPC ............ *G01C 21/3652* (2013.01); *G01C 21/20* (2013.01)

(58) Field of Classification Search
CPC ......... G08B 6/00; G06F 3/016; G09B 21/003
USPC ................. 340/539.13, 407.1, 407.2, 539.11, 340/691.1, 691.2
See application file for complete search history.

(56) References Cited

U.S. PATENT DOCUMENTS

| | | | |
|---|---|---|---|
| 6,320,496 B1 * | 11/2001 | Sokoler et al. | 340/407.1 |
| 7,788,032 B2 * | 8/2010 | Moloney | 701/472 |
| 8,280,404 B1 * | 10/2012 | Roskind | 455/456.1 |
| 8,457,654 B1 * | 6/2013 | Roskind | 455/456.1 |
| 8,471,722 B2 * | 6/2013 | Kaneko et al. | 340/815.64 |
| 8,818,714 B2 * | 8/2014 | Ooka | 701/425 |
| 2002/0111737 A1 * | 8/2002 | Hoisko | 701/209 |
| 2006/0190168 A1 * | 8/2006 | Ohnishi et al. | 701/211 |
| 2007/0106457 A1 * | 5/2007 | Rosenberg | 701/200 |
| 2007/0139167 A1 * | 6/2007 | Gilson et al. | 340/407.1 |
| 2008/0120029 A1 * | 5/2008 | Zelek et al. | 701/213 |
| 2012/0150431 A1 * | 6/2012 | Ooka | 701/425 |

FOREIGN PATENT DOCUMENTS

JP 2002-168647 6/2002

* cited by examiner

*Primary Examiner* — Eric Blount
(74) *Attorney, Agent, or Firm* — Dentons US LLP

(57) ABSTRACT

A mobile terminal apparatus including a casing, a plurality of vibrators, and a controller. The plurality of vibrators are provided inside the casing. The controller is configured to judge an orientation from a position of the casing to a target position and cause a vibration for presenting the orientation in the casing by driving at least one of the plurality of vibrators based on a result of the judgment.

13 Claims, 11 Drawing Sheets

MOBILE TERMINAL APPARATUS AND ORIENTATION PRESENTMENT METHOD

BACKGROUND

The present disclosure relates to a mobile terminal apparatus and an orientation presentment method for presenting an orientation of a target position to a user.

From the past, mobile apparatuses capable of presenting an orientation of a target to a user have been known. For example, there is known a technique that displays, based on an angle formed between a normal direction of a screen of a mobile apparatus and a direction of a target, the direction to the target on the screen of the mobile apparatus using an arrow or causing a vibrator to vibrate (see, for example, Japanese Patent Application Laid-open No. 2002-168647 (paragraphs 0047 and 0054)).

SUMMARY

With the technique described above, however, visual information such as an arrow is mainly displayed on the screen of the mobile apparatus for presenting an orientation to the user. Therefore, the user needs to look at the screen of the mobile apparatus when moving to the target. Further, although a vibrator is used, a mobile apparatus that intuitively notifies the user of the orientation to the target by the vibration is now yet known.

In view of the circumstances as described above, there is a need for a mobile terminal apparatus and an orientation presentment method with which an orientation of a target position can be intuitively presented to a user.

According to an embodiment of the present disclosure, there is provided a mobile terminal apparatus including a casing, a plurality of vibrators, and a controller. The plurality of vibrators are provided inside the casing. The controller is configured to judge an orientation from a position of the casing to a target position and cause a vibration for presenting the orientation in the casing by driving at least one of the plurality of vibrators based on a result of the judgment.

According to the mobile terminal apparatus, the controller is capable of intuitively presenting the orientation to the target position to the user by judging the orientation from the position of the casing to the target position and causing a vibration for presenting the orientation in the casing by driving at least one of the plurality of vibrators based on the result of the judgment.

It should be noted that a voice coil motor that causes a vibration in a uniaxial direction, a vibration motor that causes a vibration in multi-axial directions using a centrifugal force of a rotating eccentric weight, or the like is used as the vibrator. A vibration intensity (amplitude), vibration cycle (frequency), vibration direction, and the like can be changed distinguishably by the user.

The controller may cause, based on the result of the judgment, a predetermined number of the plurality of vibrators to vibrate sequentially at a predetermined time interval. The predetermined time interval used herein is, for example, 4 ms or more and 10 ms or less. With this structure, a tactile sense of tracing along the orientation to the target or a tactile sense of jumping over a hand toward the orientation of the target can be imparted to the user.

The casing may have a cuboid shape that includes two sides that are parallel to a longitudinal direction of the casing and two sides orthogonal to the longitudinal direction, and the plurality of vibrators may be provided in correspondence with center positions of the four sides.

With this structure, orientations of the two orthogonal directions can be intuitively presented to the user.

The casing may have a cuboid shape that includes a first direction parallel to a longitudinal direction of the casing and a second direction orthogonal to the first direction, and the plurality of vibrators may be provided plurally in the first direction and the second direction such that an intersection is located at a center of the casing.

With this structure, a tactile sense of tracing the longitudinal direction of the casing or the direction orthogonal to the longitudinal direction with a hand can be presented to the user so that the orientation can be intuitively presented to the user.

The controller may cause, based on the result of the judgment, at least two of the plurality of vibrators to vibrate at the same time.

With this structure, it is possible to cause the user to feel as if a center position of the two vibrators vibrating at the same time has vibrated so as to intuitively present the orientation to the user.

The casing may have a cuboid shape, and the plurality of vibrators may be provided in correspondence with four corners of the casing.

With this structure, by causing the two vibrators provided in correspondence with the two corners to vibrate, it is possible to cause the user to feel as if an intermediate position between the two corners has vibrated so as to intuitively present the orientation to the user.

The casing may have a cuboid shape, and the plurality of vibrators may be provided along a circumference of the casing.

With this structure, by causing the plurality of vibrators provided along the circumference of the casing to vibrate at the same time, the orientation can be more-positively presented to the user.

The plurality of vibrators may be provided adjacent to one another, and the controller may cause, based on the result of the judgment, the adjacent vibrators to sequentially vibrate at a predetermined time interval out of the plurality of vibrators.

With this structure, a tactile sense of tracing a hand can be positively imparted to the user.

A vibration waveform of the plurality of vibrators may be a sine wave. With this structure, by presenting not only a tactile sense but also a kinesthetic sense to the user, the orientation can be presented in a more-understandable manner.

The mobile terminal apparatus may further include: a first positional information acquisition unit configured to acquire and output first positional information as information on a position of the casing; a second positional information acquisition unit configured to acquire and output second positional information as information on the target position; and an orientation information acquisition unit configured to acquire and output orientation information as information on an orientation of the casing. In this case, the controller judges the orientation from the position of the casing to the target position based on the first positional information, the orientation information, and the second positional information.

With this structure, the orientation from the position of the casing to the target position can be judged based on the positional information of the casing, the orientation information of the casing, and the positional information of the target position.

According to an embodiment of the present disclosure, there is provided an orientation presentment method including acquiring first positional information as information on a position of a casing.

Second positional information as information on a target position is acquired.

Orientation information as information on an orientation of the casing is acquired.

An orientation from the position of the casing to the target position is judged based on the first positional information, the orientation information, and the second positional information.

A vibration for presenting the orientation is caused in the casing by driving at least one of the plurality of vibrators based on a result of the judgment.

As described above, according to the embodiments of the present disclosure, the orientation to the target position can be intuitively presented to the user.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Figure 1:
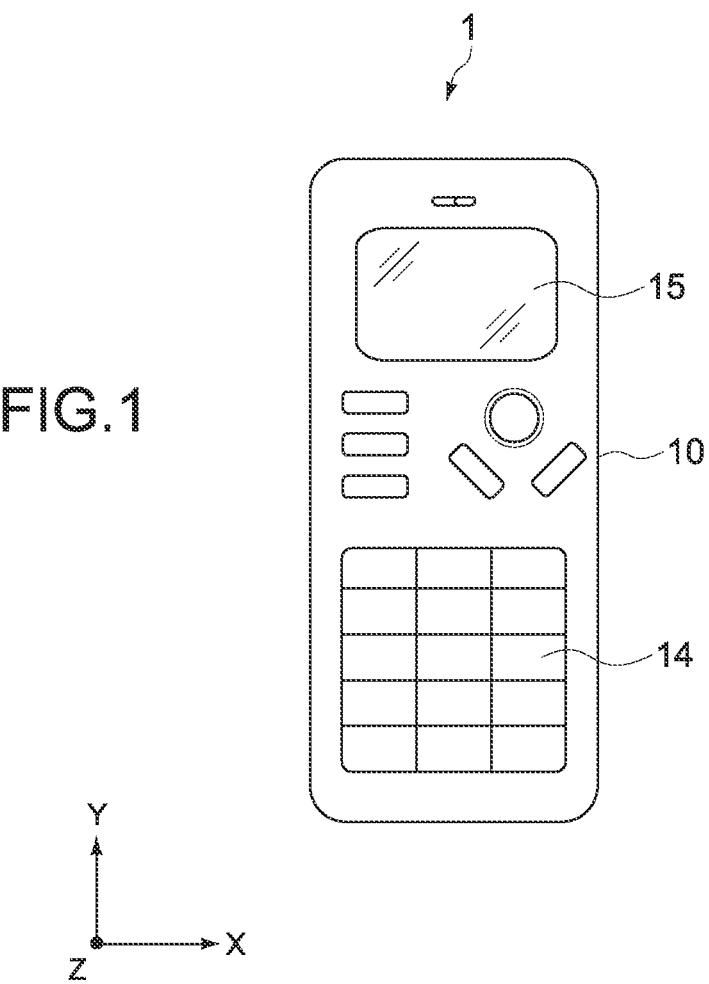
FIG. 1 is a plan view showing a mobile terminal apparatus according to an embodiment of the present disclosure.
Figure 2:
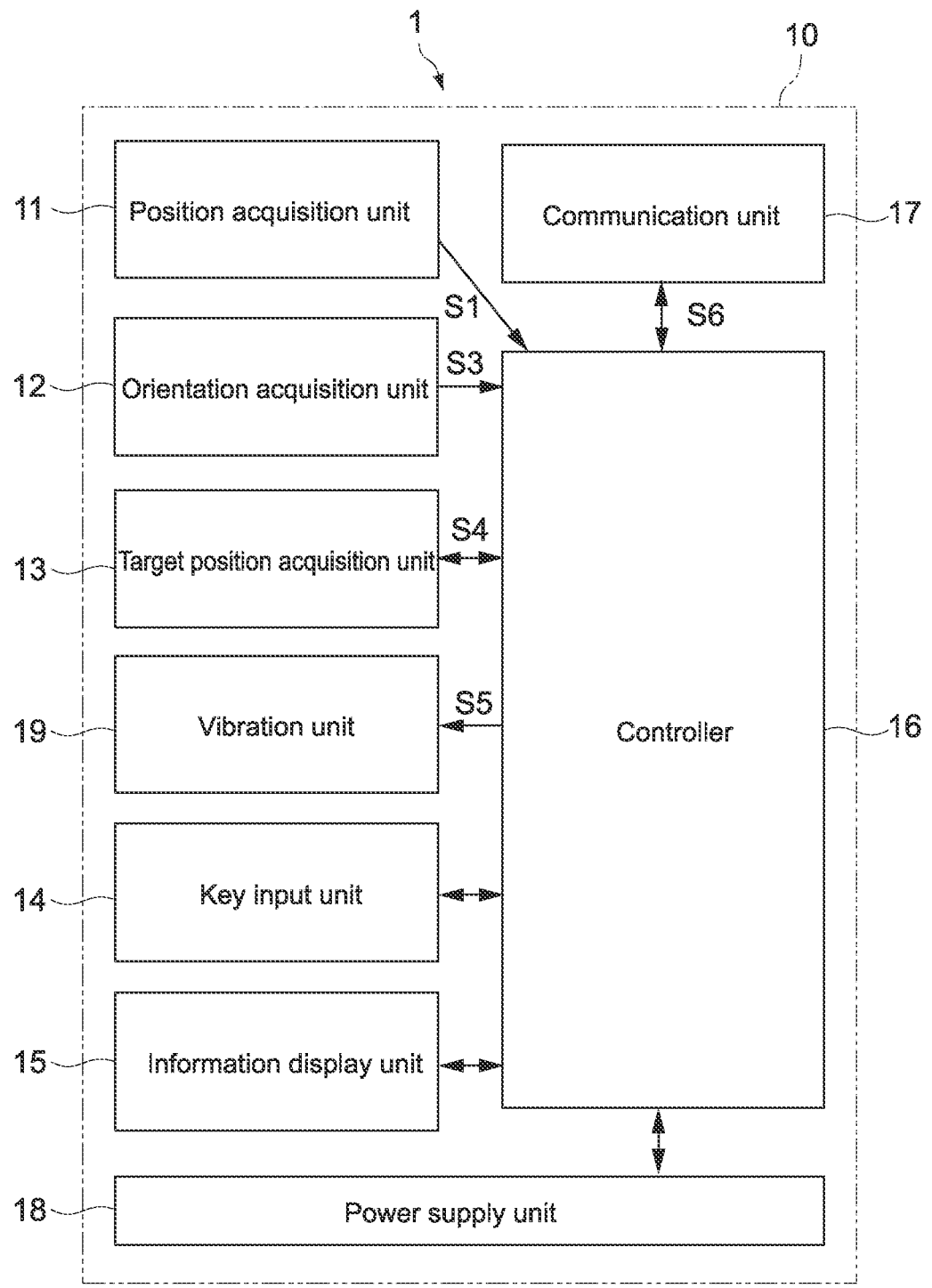
FIG. 2 is a block diagram showing an internal structure of the mobile terminal apparatus shown in FIG. 1.

FIG. 1 is a plan view showing a mobile terminal apparatus according to an embodiment of the present disclosure. FIG. 2 is a block diagram showing an internal structure of the mobile terminal apparatus shown in FIG. 1. It should be noted that the X direction in the figure is a direction orthogonal to a longitudinal direction of the mobile terminal apparatus, the Y direction is the longitudinal direction of the mobile terminal apparatus, and the Z direction is a direction orthogonal to the X axis and the Y axis.

The mobile terminal apparatus 1 includes a casing 10, a position acquisition unit 11, an orientation acquisition unit 12, a target position acquisition unit 13, a key input unit 14, an information display unit 15, a controller 16, a communication unit 17, a power supply unit 18, and a vibration unit 19.

The casing 10 practically has, for example, a cuboid shape and is of a size that a user is capable of holding. The key input unit 14 including a plurality of keys and the information display unit 15 are provided on a front surface side of the casing 10.

The position acquisition unit 11 acquires positional information of the mobile terminal apparatus 1 and outputs an output signal S1 corresponding to the positional information to the controller 16. Specifically, a GPS module is used for the position acquisition unit 11. The output signal S1 includes positional information such as a longitude and latitude indicating a position of the mobile terminal apparatus 1.

The orientation acquisition unit 12 acquires orientation information of the mobile terminal apparatus 1 and outputs an output signal S3 corresponding to the orientation information to the controller 16. Specifically, a geomagnetic sensor is used for the orientation acquisition unit 12. The output signal S3 includes orientation information of the mobile terminal apparatus 1.

The target position acquisition unit 13 is capable of acquiring (storing) positional information such as a longitude and latitude indicating a position of a certain target position on a map set by a user via the key input unit 14 and outputs an output signal S4 to the controller 16 based on an instruction from the controller 16. The output signal S4 includes positional information such as a longitude and latitude indicating a position of a certain target position on a map set by the user.

The key input unit 14 includes push-type buttons that are arranged as appropriate on a front surface of the casing 10. It should be noted that the key input unit 14 is not limited to a mechanical key and may also include a slide-type operation unit, a capacitance-type operation unit, and an optical operation unit. Output signals from the key input unit 14 include information related to various operations such as a key operation.

The information display unit 15 is constituted of a display incorporated into the surface of the casing 10 in a desired size.

The controller 16 includes a ROM, a RAM, and a CPU (MPU) and controls an operation of the mobile terminal apparatus 1 as well as supply power to the respective units of the mobile terminal apparatus 1. The controller 16 judges, based on the output signal S1 from the position acquisition unit 11, the output signal S3 from the orientation acquisition unit 12, and the output signal S4 from the target position acquisition unit 13, an orientation from the position of the mobile terminal apparatus 1 to the target position with an orientation of the mobile terminal apparatus 1 as a reference and generates a drive signal S5 for controlling a vibration of the vibration unit 19 based on the judgment result. Specifically, the judgment is for judging an angle formed between the orientation of the mobile terminal apparatus 1 and the orientation from the position of the mobile terminal apparatus 1 to the target position.

The ROM of the controller 16 stores, for example, data on a map in advance.

The communication unit 17 is constituted of a wireless communication module with which various types of data can be exchanged with a data server (not shown), though wired communication may be used instead. The communication method is not particularly limited, and inter-apparatus communication such as "Bluetooth" (registered trademark) or communication via the Internet may be used. The communication unit 17 exchanges a signal S6 with the controller 16.

The power supply unit 18 constitutes a power supply of the mobile terminal apparatus 1 and supplies necessary power to the respective units inside the casing 10. The power supply unit 18 is typically constituted of a battery. The battery may be a primary battery or a secondary battery. The power supply unit 18 may alternatively be constituted of a solar cell. It should be noted that the power supply unit 18 does not need to be provided in the case of a wired or wireless power feed.

The vibration of the vibration unit 19 is controlled based on the drive signal S5 from the controller 16.

Figure 3:
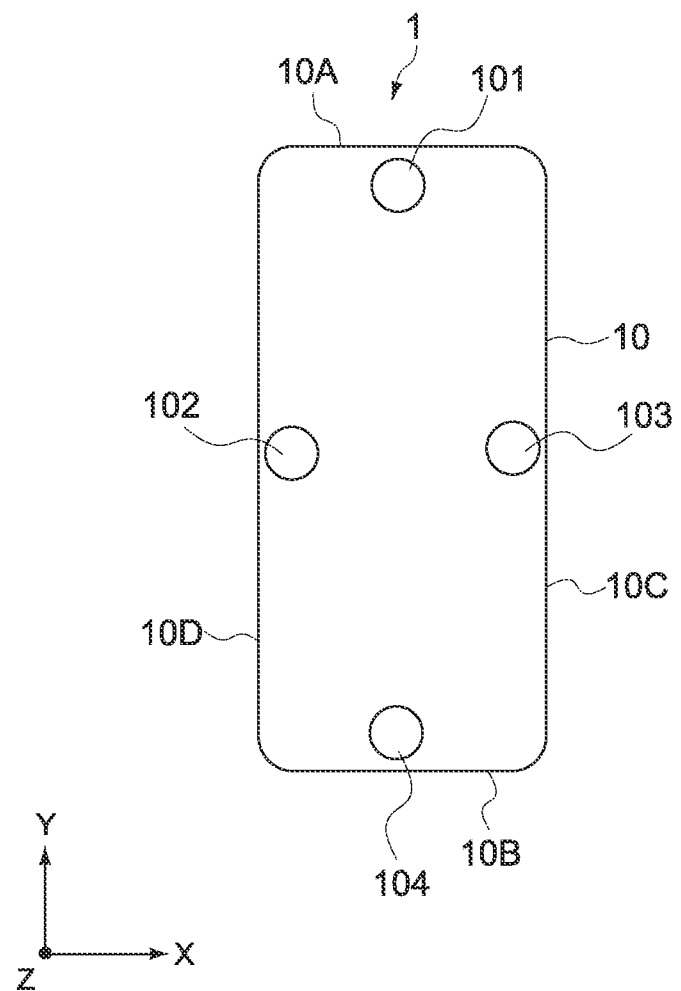
FIG. 3 is a diagram showing setting positions of a plurality of vibrators incorporated into the mobile terminal apparatus shown in FIG. 1.

FIG. 3 is a diagram showing setting positions of a plurality of vibrators of the vibration unit 19 incorporated into the mobile terminal apparatus 1 shown in FIG. 1.

The vibration unit 19 includes a plurality of vibrators 101, 102, 103, and 104. The plurality of vibrators 101 to 104 are incorporated into the casing 10 near an end portion of the casing 10. The plurality of vibrators 101 to 104 are provided so as to correspond to center positions of four sides 10A, 10B, 10C, and 10D of the casing 10. The four vibrators 101 to 104 are arranged within the same plane (XY plane). Specifically, the plurality of vibrators 101 to 104 are each constituted of, for example, a voice coil motor. The vibrators 101 and 104 are each provided such that a movable axis of the voice coil motor becomes parallel to the Y axis, for example. The vibrators 102 and 103 are each provided such that a movable axis of the voice coil motor becomes parallel to the X axis, for example. The voice coil motor is structured such that a vibration waveform thereof becomes a sine wave, for example.

It should be noted that the setting positions of the plurality of vibrators 101 to 104 are not limited to the positions shown in FIG. 3 and can be changed as appropriate according to setting positions of other components incorporated into the casing 10, for example.

(Operation Example of Mobile Terminal Apparatus 1)

Next, an operation example of the mobile terminal apparatus 1 will be described.

Figure 4:
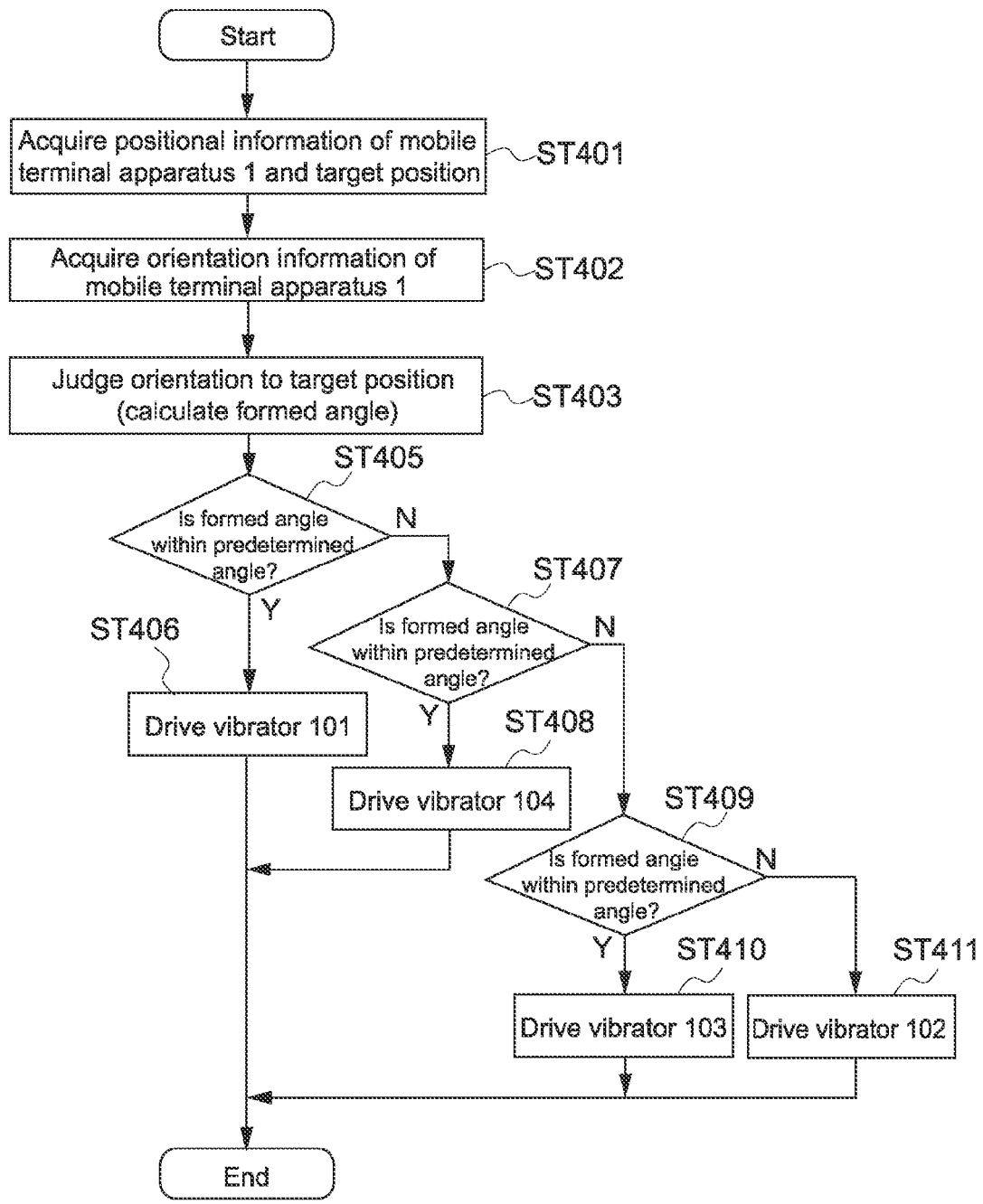
FIG. 4 is a flowchart for explaining an operation example of the mobile terminal apparatus.

FIG. 4 is a flowchart for explaining an operation example of the mobile terminal apparatus 1. In the operation example, it is assumed that a specific target position on a map is preset by the user via the key input unit 14. In other words, it is assumed that positional information of the specific target position on the map is stored in the target position acquisition unit 13.

The controller 16 of the mobile terminal apparatus 1 acquires an output signal S1 from the position acquisition unit 11 and an output signal S4 from the target position acquisition unit 13 (ST401). Accordingly, the controller 16 acquires positional information of the mobile terminal apparatus 1 and positional information of a specific target position on a map.

The controller 16 acquires an output signal S3 from the orientation acquisition unit 12 (ST402). Accordingly, the controller 16 acquires orientation information of the mobile terminal apparatus 1.

Based on the positional information of the mobile terminal apparatus 1 and the positional information of the specific target position on the map that have been acquired in ST401 and the orientation information of the mobile terminal apparatus 1 acquired in ST402, the controller 16 judges an orientation from the mobile terminal apparatus 1 to the specific target position with the orientation of the mobile terminal apparatus 1 as a reference (ST403). Specifically, an angle formed between the orientation of the mobile terminal apparatus 1 and the orientation from the mobile terminal apparatus 1 to the specific target position is calculated. The definition of such an angle can be set as appropriate. In this embodiment, the angle increases in a clockwise direction with a Y-direction plus-orientation of the mobile terminal apparatus 1 as a reference (0 degree), for example.

Next, the controller 16 judges whether the judgment result (formed angle) is 0 degree or more and smaller than 45 degrees or 315 degrees or more and smaller than 360 degrees (ST405). In the case of a positive judgment, the controller 16 outputs a drive signal S5 for driving the vibrator 101 to the vibrator 101 to thus drive the vibrator 101 (ST406).

In the case of a negative judgment in ST405, the controller 16 judges whether the formed angle is 135 degrees or more and smaller than 225 degrees (ST407). In the case of a positive judgment, the controller 16 outputs a drive signal S5 for driving the vibrator 104 to the vibrator 104 to thus drive the vibrator 104 (ST408).

In the case of a negative judgment in ST407, the controller 16 judges whether the formed angle is 45 degrees or more and smaller than 135 degrees (ST409). In the case of a positive judgment, the controller 16 outputs a drive signal S5 for driving the vibrator 103 to the vibrator 103 to thus drive the vibrator 103 (ST410).

In the case of a negative judgment in ST409, that is, when the formed angle is 225 degrees or more and smaller than 315 degrees, the controller 16 outputs a drive signal S5 to the vibrator 102 to thus drive the vibrator 102 (ST411).

As described above, according to this embodiment, the controller 16 of the mobile terminal apparatus 1 judges the orientation from the position of the mobile terminal apparatus 1 to the specific target position using the orientation of the mobile terminal apparatus 1 (Y-direction plus-orientation) as a reference (ST403) and drives one of the plurality of vibrators 101 to 104 based on the judgment result (ST405 to ST411). As a result, it becomes possible to cause a vibration that presents the orientation to the target position in the casing 10 and intuitively present the orientation to the target position to the user. At this time, since the plurality of vibrators 101 to 104 are provided inside the casing 10 near the end portion, the orientation to the target position that uses the center of the casing 10 as a reference position can be intuitively presented to the user.

In this embodiment, the plurality of vibrators 101 to 104 are provided in correspondence with the center positions of the four sides 10A, 10B, 10C, and 10D of the casing 10. Therefore, the user can clearly distinguish vibrations of the plurality of vibrators 101 to 104 from one another. As described above, the orientation can be clearly and intuitively presented to the user with a small number of vibrators 101 to 104.

The vibrators 101 and 104 are each provided such that the movable axis of the voice coil motor becomes parallel to the Y axis, and the vibrators 102 and 103 are each provided such that the movable axis of the voice coil motor becomes parallel to the X axis. In addition, the vibrators 101 to 104 are structured such that the vibration waveforms thereof become sine waves, for example. Therefore, with the vibration direction of the vibrator and the direction to be presented being the same, not only a tactile sense but also a kinesthetic sense can be presented to the user.

Next, another operation example of the mobile terminal apparatus 1 will be described.

Figure 5:
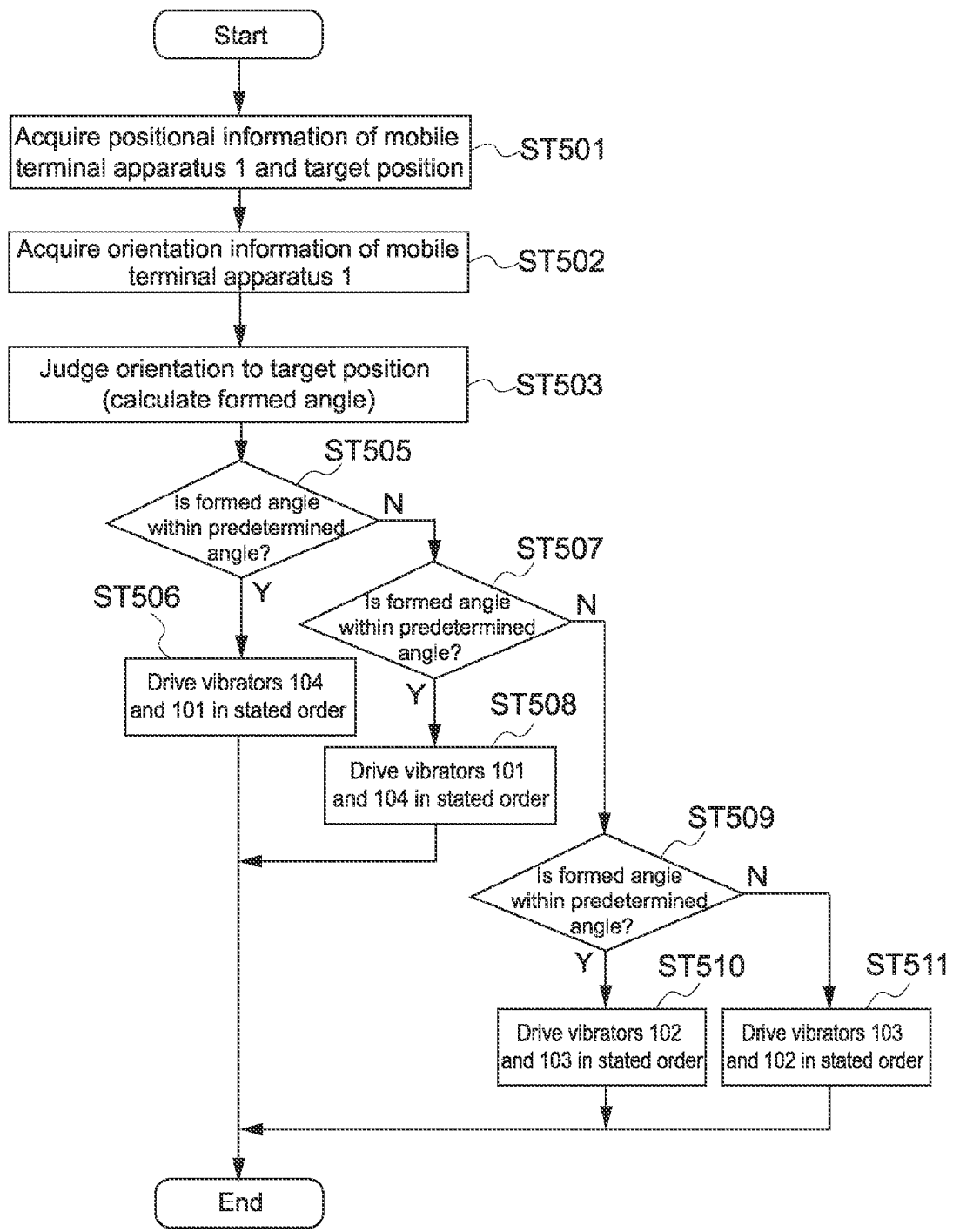
FIG. 5 is a flowchart for explaining another operation example of the mobile terminal apparatus.

FIG. 5 is a flowchart for explaining another operation example of the mobile terminal apparatus 1.

In this operation example, since ST501 to ST503 shown in FIG. 5 are the same as ST401 to ST403 shown in FIG. 4, descriptions thereof will be omitted, and descriptions will be given on ST505 and subsequent steps.

The controller 16 judges whether the formed angle is 0 degree or more and smaller than 45 degrees or 315 degrees or more and smaller than 360 degrees (ST505). In the case of a positive judgment, the controller 16 drives the vibrators 104 and 101 in the stated order at a predetermined time interval (ST506). The predetermined time interval is, for example, 4 ms or more and 10 ms or less (hereinafter, other predetermined time intervals are also 4 ms or more and 10 ms or less, for example). As a result, two different stimuli can be positively imparted to the user. At this time, the controller 16 controls the vibrations of the vibrators 104 and 101 such that the vibration of the vibrator 101 becomes larger than that of the vibrator 104.

In the case of a negative judgment in ST505, the controller 16 judges whether the formed angle is 135 degrees or more and smaller than 225 degrees (ST507). In the case of a positive judgment, the controller 16 drives the vibrators 101 and 104 in the stated order at a predetermined time interval (ST508). At this time, the controller 16 controls the vibrations of the vibrators 101 and 104 such that the vibration of the vibrator 104 becomes larger than that of the vibrator 101.

In the case of a negative judgment in ST507, the controller 16 judges whether the formed angle is 45 degrees or more and smaller than 135 degrees (ST509). In the case of a positive judgment, the controller 16 drives the vibrators 102 and 103 in the stated order at a predetermined time interval (ST510). At this time, the controller 16 controls the vibrations of the vibrators 102 and 103 such that the vibration of the vibrator 103 becomes larger than that of the vibrator 102.

In the case of a negative judgment in ST509, that is, when the formed angle is 225 degrees or more and smaller than 315 degrees, the controller 16 drives the vibrators 103 and 102 in the stated order at a predetermined time interval (ST511). At this time, the controller 16 controls the vibrations of the vibrators 103 and 102 such that the vibration of the vibrator 102 becomes larger than that of the vibrator 103.

As described above, according to this operation example, since the plurality of vibrators can be driven in a predetermined order at a predetermined time interval, the orientation from the vibrator that is driven first to the vibrator that is driven after that can be intuitively presented to the user. At this time, since the vibration of the vibrator that is driven first is smaller than that of the vibrator that is driven after that, the orientation can be clearly presented to the user.

Further, since the vibrators 101 and 104 are largely apart from each other in the Y direction of the casing 10, for example, a feeling that the vibration moves past the hand can be imparted to the user when the controller 16 causes the vibrators 104 and 101 to vibrate sequentially, with the result that the orientation can be intuitively presented to the user.

Although the intuitive orientation presentment to a specific target position on a map has been described in this embodiment, it is also possible for the controller 16 to have a function of presenting an orientation to a target position (route presentment or route guide) based on map information stored in the ROM. Such a function can be effectively used when the user sets a target position and moves toward it while looking at a map displayed on the information display unit 15 of the mobile terminal apparatus 1, for example. Specifically, the mobile terminal apparatus 1 causes, as well as display the map and a shortest route to the target position from the current position with respect to a user input of the target position, the vibrators to vibrate so as to indicate an orientation toward the shortest route so that the user can use the shortest route. For example, when judging that there is no road that linearly leads to the target position from the current position based on the map information, the mobile terminal apparatus 1 searches for the shortest route and presents an orientation toward the shortest route that is different from the orientation from the current position to the target position. As a result, with the intuitive presentment by the vibrations while acquiring visual information from the map, the user can reach the target position more-positively and within a short time.

In this case, the mobile terminal apparatus 1 may present a plurality of routes that can be selected by the user with respect to the user input on the target position. Accordingly, usability can be improved. Moreover, an application that executes the orientation presentment may include a mode for causing the vibrators to vibrate continuously for the orientation presentment and a mode for causing the vibrators to vibrate when the current position of the mobile terminal apparatus 1 is within a predetermined distance from a traffic intersection on a map or the like after activation. Accordingly, a time during which the vibrators vibrate can be suppressed to thus save power. It should be noted that the route presentment function and the route guide function may be added to the embodiments to be described later as in this embodiment.

Second Embodiment

Figure 6:
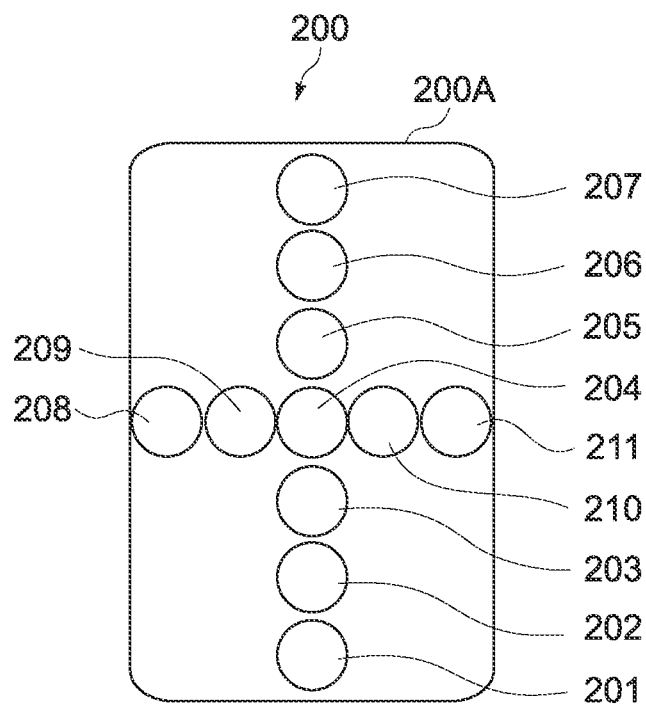
FIG. 6 is a diagram showing setting positions of a plurality of vibrators incorporated into a mobile terminal apparatus according to a second embodiment of the present disclosure.

FIG. 6 is a diagram showing setting positions of a plurality of vibrators incorporated into a mobile terminal apparatus according to a second embodiment of the present disclosure. It should be noted that since the setting positions and control of the plurality of vibrators of this embodiment differ from those of the above embodiment, the same structural elements are denoted by the same symbols, and different points will mainly be described.

A mobile terminal apparatus 200 of this embodiment includes a plurality of vibrators 201, 202, 203, 204, 205, 206, 207, 208, 209, 210, and 211 in place of the plurality of vibrators 101 to 104 of the above embodiment. The plurality of vibrators 201 to 211 are arranged in a cross that has an intersection positioned at a center of a casing 200A. In other words, the plurality of vibrators 201 to 207 are arranged adjacent to one another in the stated order with a Y-direction plus-orientation while being parallel to the Y direction. The plurality of vibrators 208, 209, 204, 210, and 211 are arranged adjacent to one another in the stated order with an X-direction plus-orientation while being parallel to the X direction. The vibrator 204 is provided at a position corresponding to the intersection of the cross. The vibrators 201, 207, 208, and 211 are each provided near an end portion of the casing 200A. The plurality of vibrators 201 to 211 are provided within the XY plane. It should be noted that the setting positions of the plurality of vibrators 201 to 211 can be changed as appropriate according to positions of other components incorporated into the casing 200A.

A controller of the second embodiment is capable of judging, based on the output signal S1 from the position acquisition unit 11, the output signal S3 from the orientation acquisition unit 12, and the output signal S4 from the target position acquisition unit 13, an orientation from the mobile terminal apparatus 200 to a target position (formed angle) using an orientation of the mobile terminal apparatus 200 as a reference, generating drive signals for causing the plurality of vibrators 201 to 207 or the plurality of vibrators 208, 209, 204, 210, and 211 to vibrate at a predetermined time interval in a predetermined order based on the judgment result (formed angle), and outputting the drive signals to the plurality of vibrators 201 to 207 or the plurality of vibrators 208, 209, 204, 210, and 211.

Figure 7:
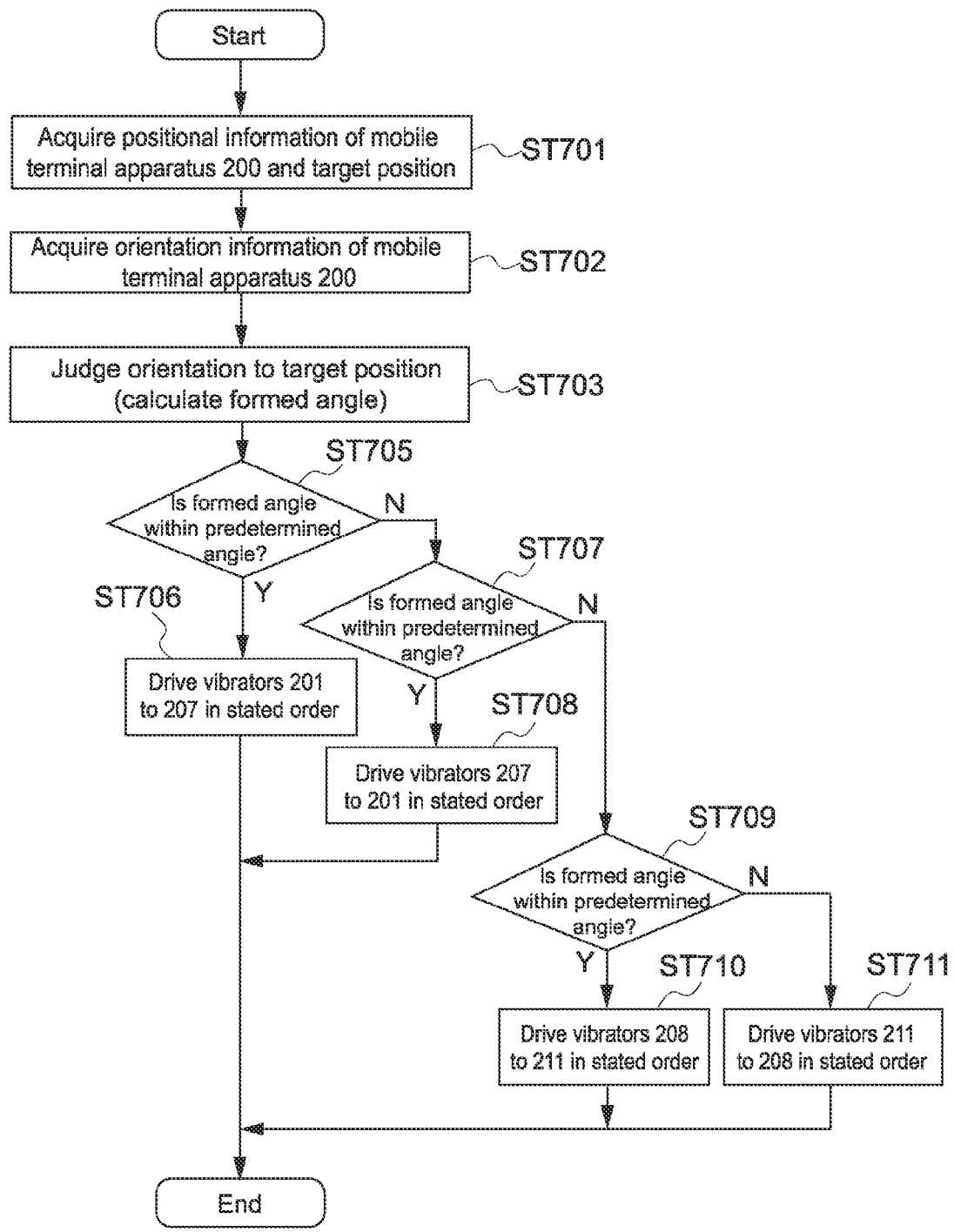
FIG. 7 is a flowchart for explaining an operation example of the mobile terminal apparatus shown in FIG. 6.

FIG. 7 is a flowchart for explaining an operation example of the mobile terminal apparatus 200 shown in FIG. 6.

In this operation example, since ST701 to ST703 shown in FIG. 7 are the same as ST401 to ST403 shown in FIG. 4 (up to calculation of formed angle), descriptions thereof will be omitted, and descriptions will be given on ST705 and subsequent steps.

The controller 16 of the second embodiment judges whether the judgment result (formed angle) obtained by the controller 16 is 0 degree or more and smaller than 45 degrees or 315 degrees or more and smaller than 360 degrees (ST705). In the case of a positive judgment, the controller 16 drives the vibrators 201, 202, 203, 204, 205, 206, and 207 in the stated order at a predetermined time interval (ST706).

In the case of a negative judgment in ST705, the controller 16 judges whether the formed angle is 135 degrees or more and smaller than 225 degrees (ST707). In the case of a positive judgment, the controller 16 drives the vibrators 207, 206, 205, 204, 203, 202, and 201 in the stated order at a predetermined time interval (ST708).

In the case of a negative judgment in ST707, the controller 16 judges whether the formed angle is 45 degrees or more and smaller than 135 degrees (ST709). In the case of a positive judgment, the controller 16 drives the vibrators 208, 209, 204, 210, and 211 in the stated order at a predetermined time interval (ST710).

In the case of a negative judgment in ST709, that is, when the formed angle is 225 degrees or more and smaller than 315 degrees, the controller 16 drives the vibrators 211, 210, 204, 209, and 208 in the stated order at a predetermined time interval (ST711).

As described above, according to this embodiment, the plurality of vibrators 201 to 207 provided adjacent to one another in the Y direction can be caused to vibrate in the stated order or the opposite order at a predetermined time interval (e.g., 4 ms or more and 10 ms or less) or the plurality of vibrators 208, 209, 204, 210, and 211 provided adjacent to one another in the X direction can be caused to vibrate in the stated order or the opposite order at a predetermined time interval (e.g., 4 ms or more and 10 ms or less). As a result, a tactile sense as if the user is sequentially tracing different parts of a palm can be imparted to the user, and thus the orientation can be intuitively presented to the user.

At this time, as stimulus variables, it is favorable to appropriately adjust a stimulus presentment time as a time during which a stimulus is presented to the user, a presentment time interval, an inter-stimulus distance, and the like. Particularly-important stimulus variables are known to be the stimulus presentment time and present time interval, so it is more favorable to adjust them.

Specifically, by setting the vibration amplitudes of the vibrators 201 and 207 to be larger than those of the vibrators 202 to 206 when driving the plurality of vibrators 201 to 207 at a predetermined time interval in the stated order, a feeling that the vibrations move past the hand in addition to the feeling of tracing the hand can be imparted to the user, with the result that the orientation can be more-intuitively presented to the user. Moreover, the controller 16 may perform control such that the vibration amplitudes of the plurality of vibrators 201 to 207 gradually increase or the vibration times thereof gradually become longer in the stated order.

Third Embodiment

Figure 8:
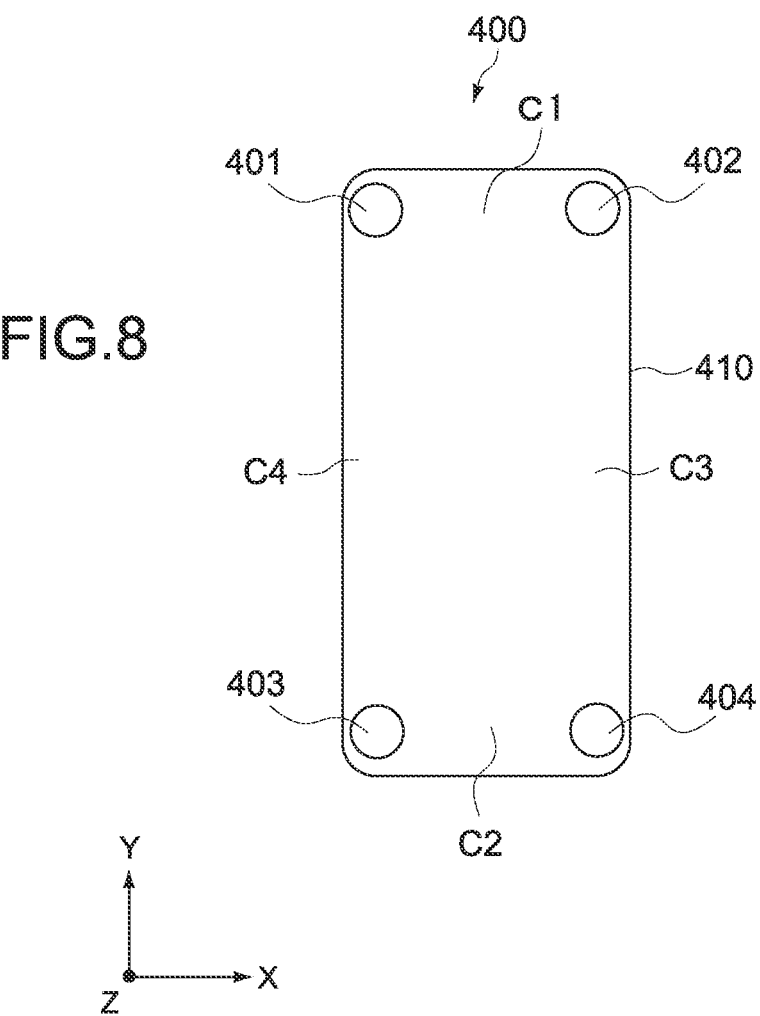
FIG. 8 is a diagram showing setting positions of a plurality of vibrators incorporated into a mobile terminal apparatus according to a third embodiment of the present disclosure.

FIG. 8 is a diagram showing setting positions of a plurality of vibrators incorporated into a mobile terminal apparatus according to a third embodiment of the present disclosure. It should be noted that since the setting positions and control of the plurality of vibrators of this embodiment differ from those of the above embodiments, the same structural elements are denoted by the same symbols, and different points will mainly be described.

A mobile terminal apparatus 400 of this embodiment includes a plurality of vibrators 401, 402, 403, and 404 in place of the plurality of vibrators 101 to 104 of the first embodiment. The plurality of vibrators 401 to 404 are incorporated into a casing 410 of the mobile terminal apparatus 400 near four corners of the casing 410. The plurality of vibrators 401 to 404 are arranged within the XY plane. It should be noted that the setting positions of the plurality of vibrators 401 to 404 are not limited to those shown in FIG. 8 and can be changed as appropriate according to positions of other components incorporated into the casing 410, for example.

The controller 16 of the third embodiment judges, based on the output signal S1 from the position acquisition unit 11, the output signal S3 from the orientation acquisition unit 12, and the output signal S4 from the target position acquisition unit 13, an orientation from the mobile terminal apparatus 400 to a target position using an orientation of the mobile terminal apparatus 400 as a reference. The controller 16 is capable of generating, based on the judgment result (formed angle), drive signals for causing two of the plurality of vibrators 401 to 404 to vibrate at the same time, and outputting the drive signals to the two vibrators. Next, specific control will be described.

Figure 9:
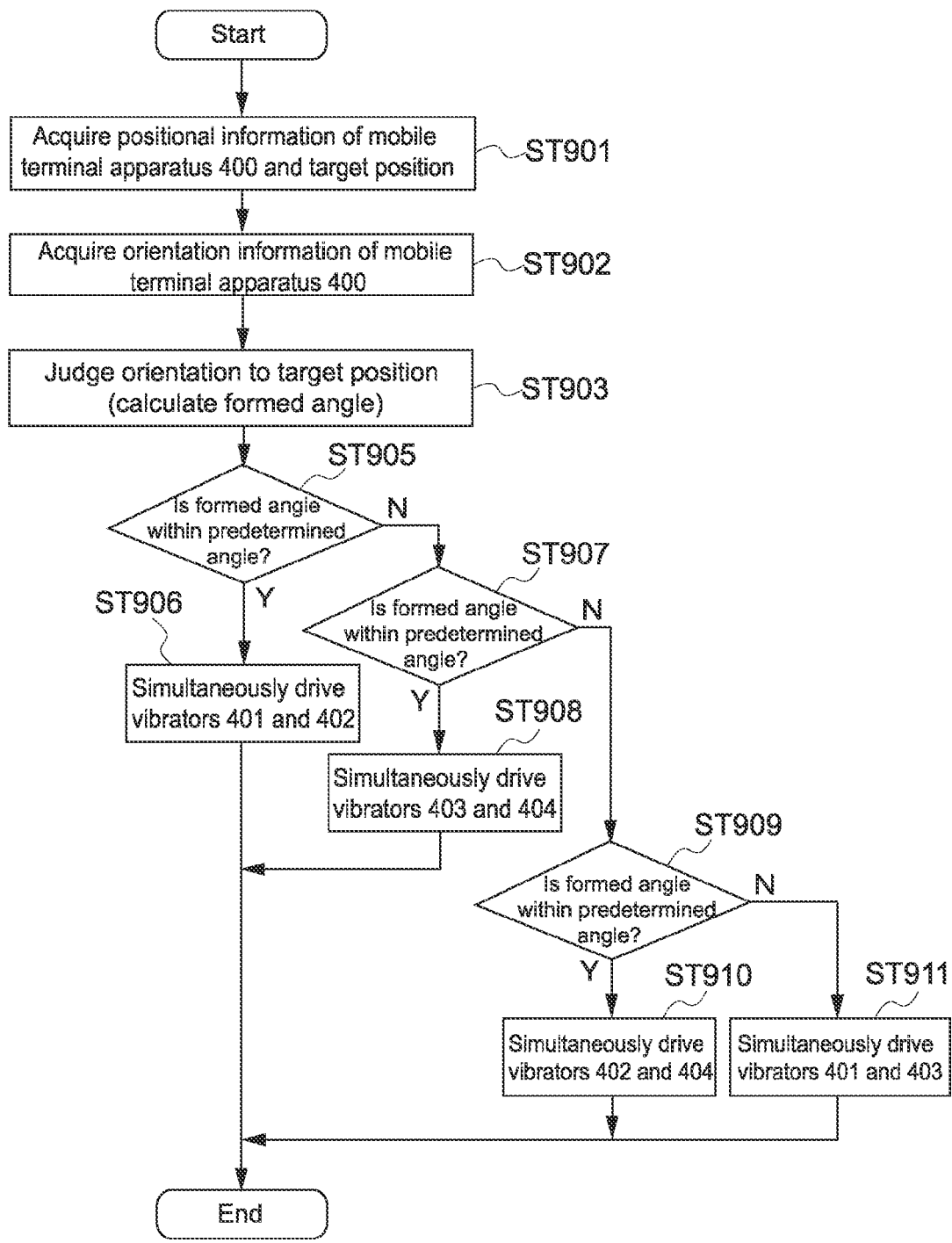
FIG. 9 is a flowchart for explaining an operation example of the mobile terminal apparatus shown in FIG. 8.

FIG. 9 is a flowchart for explaining an operation example of the mobile terminal apparatus 400 shown in FIG. 8.

In this operation example, since ST901 to ST903 shown in FIG. 9 are the same as ST401 to ST403 shown in FIG. 4 (up to calculation of formed angle), descriptions thereof will be omitted, and descriptions will be given on ST905 and subsequent steps.

The controller 16 of the third embodiment judges whether the judgment result (formed angle) obtained by the controller 16 is 0 degree or more and smaller than 45 degrees or 315 degrees or more and smaller than 360 degrees (ST905). In the case of a positive judgment, the controller 16 simultaneously drives the vibrators 401 and 402 for the same period of time and at the same amplitude (ST906).

In the case of a negative judgment in ST905, the controller 16 judges whether the formed angle is 135 degrees or more and smaller than 225 degrees (ST907). In the case of a positive judgment, the controller 16 simultaneously drives the vibrators 403 and 404 for the same period of time and at the same amplitude (ST908).

In the case of a negative judgment in ST907, the controller 16 judges whether the formed angle is 45 degrees or more and smaller than 135 degrees (ST909). In the case of a positive judgment, the controller 16 simultaneously drives the vibrators 402 and 404 for the same period of time and at the same amplitude (ST910).

In the case of a negative judgment in ST909, that is, when the formed angle is 225 degrees or more and smaller than 315 degrees, the controller 16 simultaneously drives the vibrators 401 and 403 for the same period of time and at the same amplitude (ST911).

As described above, according to this embodiment, two vibrators can be caused to vibrate simultaneously for the same period of time and at the same amplitude based on the judgment result (formed angle) (ST905 to ST911). As a result, when the vibrators 401 and 402 are caused to vibrate simultaneously for the same period of time and at the same amplitude, for example, a feeling as if an intermediate point C1 between the vibrators 401 and 402 has vibrated can be imparted to the user. When the vibrators 403 and 404 are caused to vibrate simultaneously for the same period of time and at the same amplitude, a feeling as if an intermediate point C2 between the vibrators 403 and 404 has vibrated can be imparted to the user. Similarly, when the vibrators 402 and 404 are caused to vibrate simultaneously for the same period of time and at the same amplitude, a feeling as if an intermediate point C3 between the vibrators 402 and 404 has vibrated can be imparted to the user. When the vibrators 401 and 403 are caused to vibrate simultaneously for the same period of time and at the same amplitude, a feeling as if an intermediate point C4 between the vibrators 401 and 403 has vibrated can be imparted to the user.

As described above, since the mobile terminal apparatus 400 is capable of making the user feel as if one of the intermediate points C1 to C4 has vibrated (phantom sensation) based on the judgment result (formed angle), the orientation can be intuitively presented to the user.

In the third embodiment, the example in which the vibration amplitudes of the plurality of vibrators 401 to 404 are the same has been described. However, the present disclosure is not limited thereto, and it is also possible for the controller 16 to adjust, based on the judgment result (formed angle), a ratio of the vibration amplitude of the vibrator 402 to that of the vibrator 401, a ratio of the vibration amplitude of the vibrator 404 to that of the vibrator 403, a ratio of the vibration amplitude of the vibrator 404 to that of the vibrator 402, and a ratio of the vibration amplitude of the vibrator 403 to that of the vibrator 401.

With such a structure, it becomes possible to make the user feel as if a desired position on a circumference of the mobile terminal apparatus 400 has vibrated. In this case, an orientation to a target position can be specifically presented to the user with a small number of vibrators 401 to 404.

Fourth Embodiment

Figure 10:
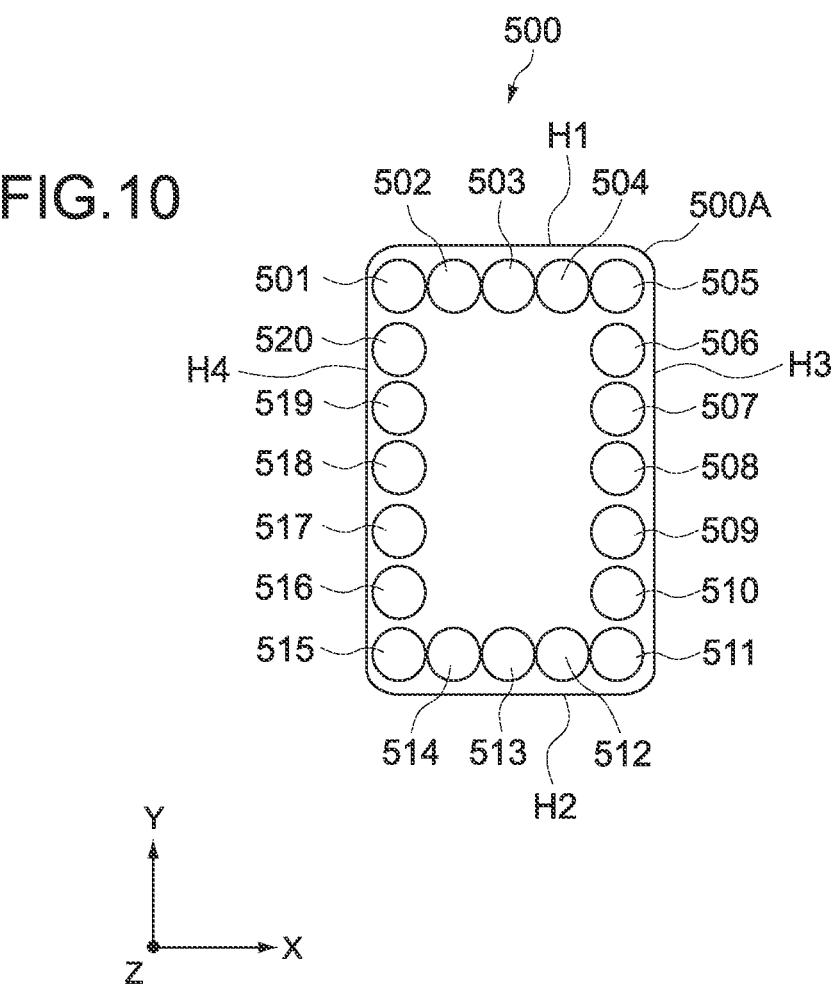
FIG. 10 is a diagram showing setting positions of a plurality of vibrators incorporated into a mobile terminal apparatus according to a fourth embodiment of the present disclosure.

FIG. 10 is a diagram showing setting positions of a plurality of vibrators incorporated into a mobile terminal apparatus according to a fourth embodiment of the present disclosure. It should be noted that since the setting positions and control of the plurality of vibrators of this embodiment differ from those of the above embodiments, the same structural elements are denoted by the same symbols, descriptions thereof will be omitted, and different points will mainly be described.

A mobile terminal apparatus 500 of the fourth embodiment includes a plurality of vibrators 501, 502, 503, 504, 505, 506, 507, 508, 509, 510, 511, 512, 513, 514, 515, 516, 517, 518, 519, and 520. The plurality of vibrators 501 to 520 are incorporated into a casing 500A of the mobile terminal apparatus 500 while encompassing it along a circumferential portion of the casing 500A.

Specifically, five vibrators 501 to 505 are provided adjacent to one another along one side H1 parallel to the X direction of the mobile terminal apparatus 500, five vibrators 511 to 515 are provided adjacent to one another along one side H2 parallel to the X direction of the mobile terminal apparatus 500, seven vibrators 505 to 511 are provided adjacent to one another along one side H3 parallel to the Y direction of the mobile terminal apparatus 500, and seven vibrators 515 to 520 and 501 are provided adjacent to one another along one side H4 parallel to the Y direction of the mobile terminal apparatus 500.

The controller 16 of the mobile terminal apparatus 500 is capable of judging, based on the output signal S1 from the position acquisition unit 11, the output signal S3 from the orientation acquisition unit 12, and the output signal S4 from the target position acquisition unit 13, an orientation from the mobile terminal apparatus 500 to a target position using an orientation of the mobile terminal apparatus 500 as a reference, and generating drive signals for causing the plurality of vibrators 501 to 505 to vibrate at a predetermined time interval in a predetermined order based on the judgment result (formed angle) and outputting the drive signals to the plurality of vibrators 501 to 505 or generating drive signals for causing the plurality of vibrators 511 to 515 to vibrate at a predetermined time interval in a predetermined order and outputting the drive signals to the plurality of vibrators 511 to 515 or generating drive signals for causing the plurality of vibrators 505 to 511 to vibrate at a predetermined time interval in a predetermined order and outputting the drive signals to the plurality of vibrators 505 to 511 or generating drive signals for causing the plurality of vibrators 501 and 520 to 515 to vibrate at a predetermined time interval in a predetermined order and outputting the drive signals to the plurality of vibrators 501 and 520 to 515.

Figure 11:
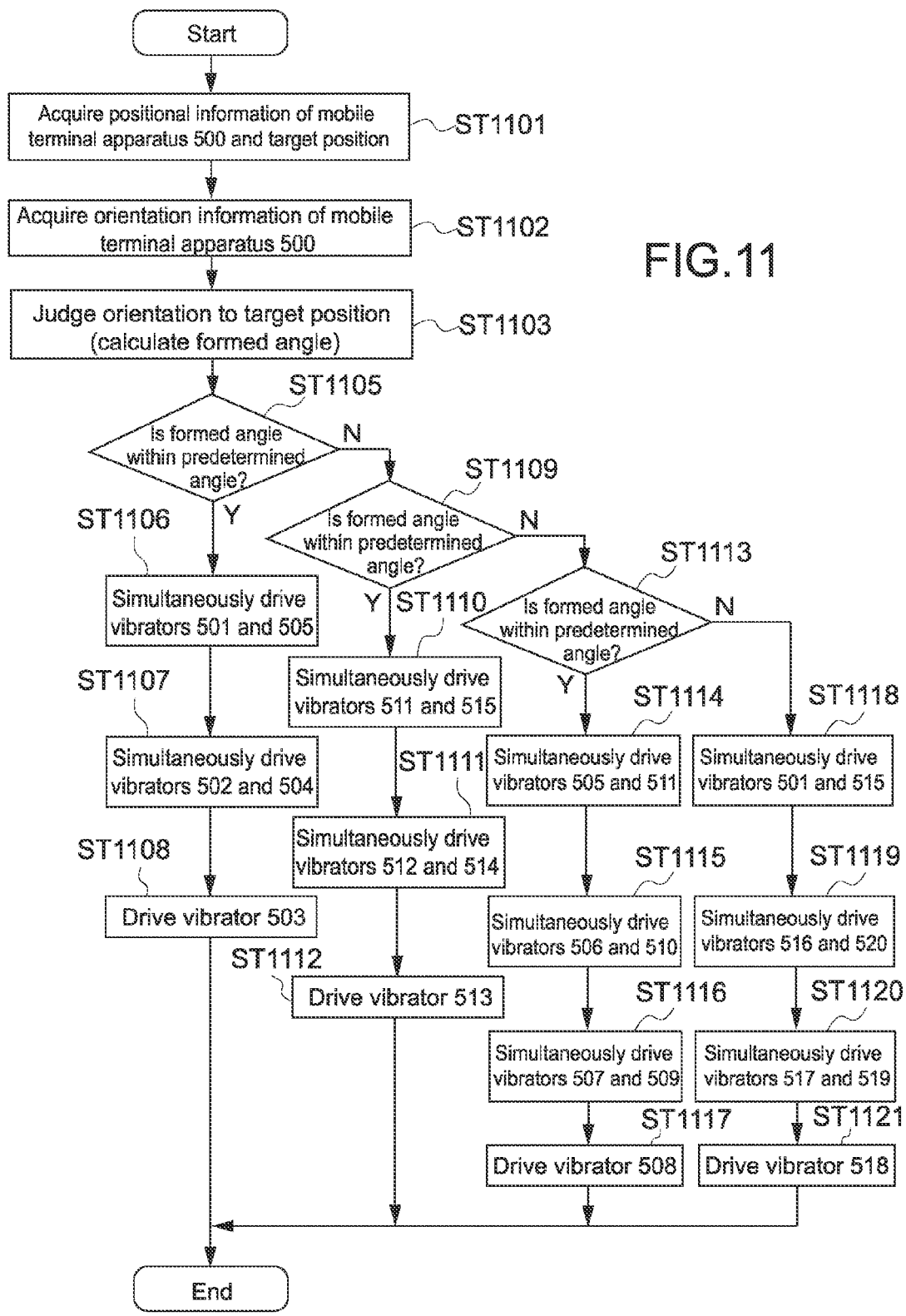
FIG. 11 is a flowchart for explaining an operation example of the mobile terminal apparatus shown in FIG. 10.

FIG. 11 is a flowchart for explaining an operation example of the mobile terminal apparatus shown in FIG. 10.

In this operation example, since ST1101 to ST1103 shown in FIG. 11 are the same as ST401 to ST403 shown in FIG. 4 (up to calculation of formed angle), descriptions thereof will be omitted, and descriptions will be given on ST1105 and subsequent steps.

The controller 16 of the fourth embodiment judges whether the judgment result (formed angle) is 0 degree or more and smaller than 45 degrees or 315 degrees or more and smaller than 360 degrees (ST1105). In the case of a positive judgment, the controller 16 simultaneously drives the vibrators 501 and 505 for the same period of time and at the same amplitude (ST1106). Subsequently, the controller 16 simultaneously drives the vibrators 502 and 504 for the same period of time and at the same amplitude (ST1107). Then, the controller 16 drives the vibrator 503 for the same period of time and at the same amplitude as the vibrator 504 (ST1108).

As described above, in the case of a positive judgment in ST1105, it becomes possible to make the user feel as if the position of the vibrator 503 has vibrated in ST1106 and also in ST1107, and cause the position of the vibrator 503 to vibrate in ST1108.

On the other hand, in the case of a negative judgment in ST1105, the controller 16 judges whether the formed angle is 135 degrees or more and smaller than 225 degrees (ST1109). In the case of a positive judgment, the controller 16 simultaneously drives the vibrators 511 and 515 for the same period of time and at the same amplitude (ST1110). Subsequently, the controller 16 simultaneously drives the vibrators 512 and 514 for the same period of time and at the same amplitude (ST1111). Then, the controller 16 drives the vibrator 513 for the same period of time and at the same amplitude as the vibrator 514 (ST1112).

As described above, in the case of a positive judgment in ST1109, it becomes possible to make the user feel as if the position of the vibrator 513 has vibrated in ST1110 and also in ST1111, and cause the position of the vibrator 513 to vibrate in ST1112.

In the case of a negative judgment in ST1109, the controller 16 judges whether the formed angle is 45 degrees or more and smaller than 135 degrees (ST1113). In the case of a positive judgment, the controller 16 simultaneously drives the vibrators 505 and 511 for the same period of time and at the same amplitude (ST1114). Subsequently, the controller 16 simultaneously drives the vibrators 506 and 510 for the same period of time and at the same amplitude (ST1115). Next, the controller 16 simultaneously drives the vibrators 507 and 509 for the same period of time and at the same amplitude (ST1116).

Then, the controller 16 drives the vibrator 508 for the same period of time and at the same amplitude as the vibrator 507 (ST1117).

As described above, in the case of a positive judgment in ST1113, it becomes possible to make the user feel as if the position of the vibrator 508 has vibrated in ST1114, ST1115, and ST1116, and cause the position of the vibrator 508 to vibrate in ST1117.

In the case of a negative judgment in ST1113, that is, when the formed angle is 225 degrees or more and smaller than 315 degrees, the controller 16 simultaneously drives the vibrators 501 and 515 for the same period of time and at the same amplitude (ST1118). Subsequently, the controller 16 simultaneously drives the vibrators 516 and 520 for the same period of time and at the same amplitude (ST1119). Next, the controller 16 simultaneously drives the vibrators 517 and 519 for the same period of time and at the same amplitude (ST1120). Then, the controller 16 drives the vibrator 518 for the same period of time and at the same amplitude as the vibrator 517 (ST1121).

As described above, in the case of a negative judgment in ST1113, it becomes possible to make the user feel as if the position of the vibrator 518 has vibrated in ST1118, ST1119, and ST1120, and cause the position of the vibrator 518 to vibrate in ST1121.

As described above, according to this embodiment, it is possible to make the user feel as if the vibrator 503, 513, 508, or 518 has vibrated according to the judgment result (formed angle) obtained by the controller 16.

In addition, according to this embodiment, since the plurality of vibrators 501 to 520 are incorporated into the casing so as to encompass it along the circumferential portion of the mobile terminal apparatus 500, the orientation to the target position can be positively presented to the user irrespective of a way the user holds the mobile terminal apparatus 500 or a holding position of the mobile terminal apparatus 500.

Further, in this embodiment, the example in which the plurality of vibrators are caused to vibrate at the same time has been described. However, the drive control of the plurality of vibrators 501 to 520 arranged as shown in FIG. 10 may be changed. Specifically, the controller may drive the vibrators 511, 510, 509, . . . and 505 in the stated order at a predetermined time interval when presenting the Y-direction plus-orientation to the user or drive the vibrators 515 to 511 in the stated order at a predetermined time interval when presenting the X-direction plus-orientation to the user. Also under such control, the orientation can be intuitively presented to the user.

Heretofore, the embodiments of the present disclosure have been described. However, the present disclosure is not limited to the embodiments above, and various modifications can be added without departing from the gist of the present disclosure.

In the embodiments above, the example in which a specific target position on a map is preset by the user via the key input unit 14 has been described. However, the present disclosure is also applicable to a case where the user sets another mobile terminal apparatus including a GPS function as a target, for example. In this case, the position acquisition unit 11 acquires positional information of the target mobile terminal apparatus set by the user via the key input unit 14 and outputs an output signal corresponding to the positional information to the controller 16. The output signal includes positional information such as a longitude and latitude indicating a position of the target mobile terminal apparatus set by the user. Moreover, the controller 16 judges an orientation from the position of the mobile terminal apparatus 1 to the position of the target mobile terminal apparatus using the orientation of the mobile terminal apparatus 1 as a reference and generates a drive signal S5 for controlling the vibration of the vibration unit 19 based on the judgment result. Specifically, the judgment is for judging an angle formed between the orientation of the mobile terminal apparatus 1 and the orientation from the position of the mobile terminal apparatus 1 to the position of the target mobile terminal apparatus. In this operation example, the mobile terminal apparatus 1 is capable of driving a predetermined vibrator based on the judgment result and intuitively presenting the orientation of the target mobile terminal apparatus to the user.

In the embodiments above, the example that uses a specific number of vibrators has been described. However, the number is not particularly limited, and three vibrators or 5 vibrators may be used instead, for example. Also in such cases, the orientation can be presented by similarly judging an orientation to a target position (formed angle) and driving at least one of the plurality of vibrators. Moreover, by sequentially driving the plurality of vibrators at a predetermined time interval, vibrations can be continuously applied to different parts of a hand to thus present an orientation.

In the first embodiment, the example of driving one of the vibrators 101 to 104 shown in FIG. 3 has been described. However, for presenting the orientation to a target position, it is possible to cause the vibrators 101 and 102 to vibrate at the same time, cause the vibrators 101 and 103 to vibrate at the same time, cause the vibrators 102 and 104 to vibrate at the same time, or cause the vibrators 103 and 104 to vibrate at the same time. As a result, a more-specific orientation can be intuitively presented to the user.

In the second embodiment, the example in which the plurality of vibrators 201 to 211 are incorporated into the casing 200A while being arranged in a cross has been described. However, the number and setting positions of the plurality of vibrators 201 to 211 and the like are not limited thereto and can be changed as appropriate.

In the fourth embodiment, the example in which five vibrators are arranged in the X direction and seven vibrators are arranged in the Y direction as shown in FIG. 10 has been described. However, the number of vibrators to be arranged is not limited thereto.

It should be noted that the present disclosure may also take the following structures.

(1) A mobile terminal apparatus, including:
    a casing;
    a plurality of vibrators provided inside the casing; and
    a controller configured to judge an orientation from a position of the casing to a target position and cause a vibration for presenting the orientation in the casing by driving at least one of the plurality of vibrators based on a result of the judgment.

(2) The mobile terminal apparatus according to (1),
    in which the controller causes, based on the result of the judgment, a predetermined number of the plurality of vibrators to vibrate sequentially at a predetermined time interval.

(3) The mobile terminal apparatus according to (1) or (2),
    in which the casing has a cuboid shape that includes two sides that are parallel to a longitudinal direction of the casing and two sides orthogonal to the longitudinal direction, and
    in which the plurality of vibrators are provided in correspondence with center positions of the four sides.

(4) The mobile terminal apparatus according to any one of (1) to (3),
  in which the casing has a cuboid shape that includes a first direction parallel to a longitudinal direction of the casing and a second direction orthogonal to the first direction, and
  in which the plurality of vibrators are provided plurally in the first direction and the second direction such that an intersection is located at a center of the casing.
(5) The mobile terminal apparatus according to any one of (1) to (4),
  in which the controller causes, based on the result of the judgment, at least two of the plurality of vibrators to vibrate at the same time.
(6) The mobile terminal apparatus according to any one of (1) to (5),
  in which the casing has a cuboid shape, and
  in which the plurality of vibrators are provided in correspondence with four corners of the casing.
(7) The mobile terminal apparatus according to any one of (1) to (6),
  in which the casing has a cuboid shape, and
  in which the plurality of vibrators are provided along a circumference of the casing.
(8) The mobile terminal apparatus according to any one of (1) to (7),
  in which the plurality of vibrators are provided adjacent to one another, and
  in which the controller causes, based on the result of the judgment, the adjacent vibrators to sequentially vibrate at a predetermined time interval out of the plurality of vibrators.
(9) The mobile terminal apparatus according to any one of (1) to (8), further including:
  a first positional information acquisition unit configured to acquire and output first positional information as information on a position of the casing;
  a second positional information acquisition unit configured to acquire and output second positional information as information on the target position; and
  an orientation information acquisition unit configured to acquire and output orientation information as information on an orientation of the casing,
  in which the controller judges the orientation from the position of the casing to the target position based on the first positional information, the orientation information, and the second positional information.
(10) The mobile terminal apparatus according to any one of (1) to (9),
  in which a vibration waveform of the plurality of vibrators is a sine wave.
(11) An orientation presentment method, including:
  acquiring first positional information as information on a position of a casing;
  acquiring second positional information as information on a target position;
  acquiring orientation information as information on an orientation of the casing;
  judging an orientation from the position of the casing to the target position based on the first positional information, the orientation information, and the second positional information; and
  causing a vibration for presenting the orientation in the casing by driving at least one of the plurality of vibrators based on a result of the judgment.
The present disclosure contains subject matter related to that disclosed in Japanese Priority Patent Application JP 2011-184691 filed in the Japan Patent Office on Aug. 26, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A mobile terminal apparatus, comprising:
  a casing;
  a plurality of vibrators inside the casing, the vibrators positioned along or symmetrically on opposite sides of axes centered within predetermined orientation ranges;
  a controller inside the casing;
  a casing geo-positional information unit inside the casing and which includes a global positioning system receiver (GPS receiver);
  a casing geomagnetic orientation unit inside the casing and which includes a compass;
  a target geo-positional information unit inside the casing and which includes means for receiving and storing target geo-positional information; and
  logic executable by the controller to cause the controller to (a) calculate an orientation of the apparatus relative to the target based on a global position of the casing as determined by the GPS receiver, an orientation of the casing as determined by the compass and a global position of the target as determined by information stored in the target geo-positional information unit, (b) determine which orientation range from among the various predetermined orientation ranges the calculated orientation of the apparatus relative to the target falls and (c) based on the determined orientation range, present the calculated orientation of the apparatus to the target to a user of the apparatus by driving at least two of the plurality of vibrators with same vibration intensities, same durations, in a specified sequence, or any combination of the foregoing, the at least two of the plurality of vibrators positioned along or symmetrically on opposite sides of an axis centered within the determined orientation range.
2. The mobile terminal apparatus according to claim 1, wherein the controller causes, based on the result of the judgment, a predetermined number of the plurality of vibrators to vibrate sequentially at a predetermined time interval.
3. The mobile terminal apparatus according to claim 2, wherein:
  the casing has a cuboid shape that includes two sides that are parallel to a longitudinal direction of the casing and two sides orthogonal to the longitudinal direction, and
  the plurality of vibrators are provided in correspondence with center positions of the four sides.
4. The mobile terminal apparatus according to claim 2, wherein:
  the casing has a cuboid shape that includes a first direction parallel to a longitudinal direction of the casing and a second direction orthogonal to the first direction, and
  the plurality of vibrators are provided plurally in the first direction and the second direction such that an intersection is located at a center of the casing.
5. The mobile terminal apparatus according to claim 1, wherein the controller causes, based on the result of the judgment, at least two of the plurality of vibrators to vibrate at the same time.

6. The mobile terminal apparatus according to claim 5, wherein:
the casing has a cuboid shape, and
the plurality of vibrators are provided in correspondence with four corners of the casing.

7. The mobile terminal apparatus according to claim 5, wherein:
the casing has a cuboid shape, and
the plurality of vibrators are provided along a circumference of the casing.

8. The mobile terminal apparatus according to claim 1, wherein:
the plurality of vibrators are provided adjacent to one another, and
the controller causes, based on the result of the judgment, the adjacent vibrators to sequentially vibrate at a predetermined time interval out of the plurality of vibrators.

9. The mobile terminal apparatus according to claim 1, wherein a vibration waveform of the plurality of vibrators is a sine wave.

10. An orientation presentment method, comprising:
acquiring first positional information about a global position of a casing using a global positioning unit;
recalling stored second positional information about a global position of a target;
acquiring global orientation information about global orientation of the casing using a geomagnetic orientation unit;
calculating a relative orientation of the casing to the target position based on the first positional information, the global orientation information, and the second positional information;
determining which orientation range from among various predetermined orientation ranges the calculated orientation of the apparatus relative to the target falls; and
based on the determined orientation range, presenting the calculated orientation of the apparatus to the target to a user of the apparatus by driving at least two of a plurality of vibrators with same vibration intensities, same durations, in a specified sequence, or any combination of the foregoing, the at least two of the plurality of vibrators positioned along or symmetrically on opposite sides of an axis centered within the determined orientation range.

11. The mobile terminal apparatus of claim 1, wherein the vibrators are caused to vibrate in series and the vibration amplitudes of the plurality of vibrators gradually increase or the vibration times thereof gradually become longer in the order in which the vibrators are actuated.

12. The method of claim 10, wherein the vibrators are caused to vibrate in series and the vibration amplitudes of the plurality of vibrators gradually increase or the vibration times thereof gradually become longer in the order in which the vibrators are actuated.

13. The method of claim 10, wherein the steps of acquiring the first positional information, acquiring the second positional information, acquiring the global positioning information, calculating the relative orientation of the casing to the target, determining the predetermined orientation range within which the relative orientation of the casing to the target falls, and presenting the calculated relative orientation of the casing to the target by driving at least two of the plurality of vibrators are performed by a controller which processes machine readable instructions.

* * * * *